Sept. 7, 1965   A. P. MERIANO   3,204,971

SEAL UTILIZING MECHANICAL AND FLUID PRESSURE LOADING

Filed July 23, 1962

INVENTOR.
ALBERT P. MERIANO

BY

ATTORNEY

United States Patent Office 3,204,971
Patented Sept. 7, 1965

3,204,971
SEAL UTILIZING MECHANICAL AND FLUID PRESSURE LOADING
Albert P. Meriano, Fair Oaks, Calif., assignor to Aerojet-General Corporation, Azusa, Calif., a corporation of Ohio
Filed July 23, 1962, Ser. No. 211,764
9 Claims. (Cl. 277—171)

This invention relates to a seal for preventing the escape of fluid under pressure between two parts and in particular to a seal for eliminating static seal leakage between two parts.

The principal object of the invention is to provide a seal utilizing both mechanical and fluid pressure loading to prevent leakage.

Another object of the present invention is to provide an inexpensive seal which is simple to assemble and is extremely efficient in eliminating static seal leakage.

An additional object of the present invention is to provide a seal with four sealing surfaces adapted to cooperate with the parts to be sealed, thereby eliminating static seal leakage.

In its principal aspect, the present invention comprises a sealing member which is adapted to be positioned between two parts which are desired to be sealed together against the escape of fluid therefrom. The two parts are provided with opposed tapered grooves into which the sealing member of the present invention is disposed. The sealing member is constructed of a pair of elements having their distal faces curved so that when they are positioned in the opposed tapered grooves in the parts to be sealed, there will be four lines of contact between the curved surfaces of the sealing elements and the tapered grooves of the parts to be sealed. Spring means are provided between the sealing elements to urge them into the grooves, thus providing a mechanical loading of the seal. An important feature of this invention is to arrange the spring means so that the spring means provides a continuous fluid-impervious surface between the sealing elements of the sealing member, whereby any pressurized fluid escaping between the parts to be sealed will be contained between the two sealing elements. By this arrangement, the fluid pressure will act against the sealing elements of the sealing member to urge them into the tapered grooves of the parts to be sealed, thus providing a fluid pressure loading of the seal. The term fluid as used in this description will be understood to include both liquids or gases.

Figure 1:
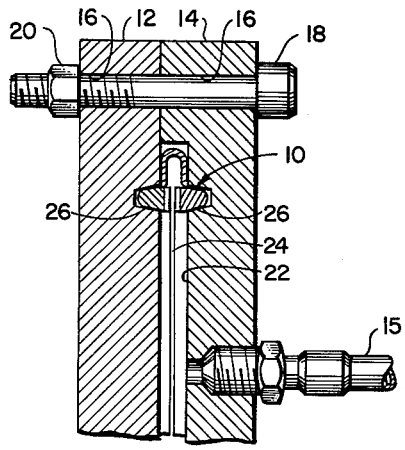
Figure 2:
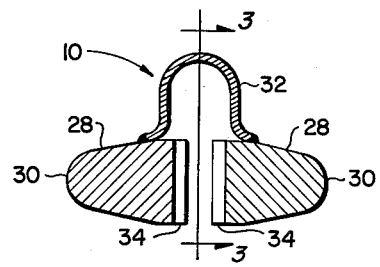
Figure 4:
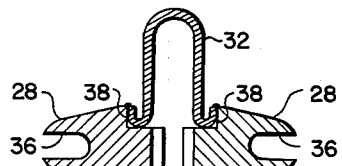
Figure 3:
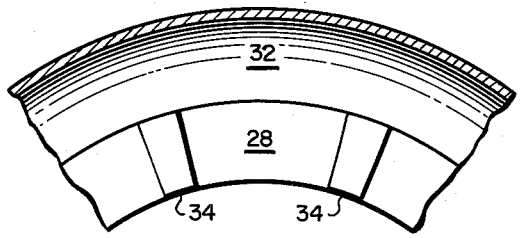
Figure 5:
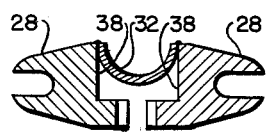
Figure 6:
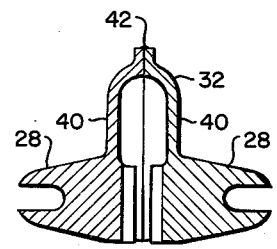

Other objects, aspects, and advantages will become apparent from the following description taken in connection with the accompanying drawing, wherein:

FIGURE 1 is a fragmentary sectional view taken along a radius of the sealing member, showing the invention as applied to adjoining parts between which a fluid-tight seal is to be provided, FIGURE 2 is an enlarged view of the sealing member shown in FIGURE 1, with the sealing member being shown in radial section, FIGURE 3 is a fragmentary sectional view taken along line 3—3 of FIGURE 2, FIGURE 4 shows in radial section a modified form of the sealing member of the present invention, FIGURE 5 shows in radial section another modification of the sealing member of this invention, and FIGURE 6 shows in radial section still a further modification of the sealing member of the present invention.

Referring now to the drawing, wherein like reference characters designate like or corresponding parts throughout the various views, there is shown in FIGURES 1, 2 and 3 a preferred embodiment of the present invention.

The sealing member of the present invention, designated generally by numeral 10, is shown as being positioned between two circular parts 12 and 14 which are desired to be sealed against the escape of fluid between said two parts entering through a fluid pressure inlet 15. Although the parts 12 and 14 have been shown as being circular plates with the fluid pressure inlet 15 connected to the central portion of plate 14, it should be appreciated that the sealing member of the present invention could be utilized between any mating surfaces which are desired to be sealed as, for example, opposed flanges of a pair of conduits through which fluid flows under pressure. Each of the parts 12 and 14 is provided with aligned openings 16 about its outer periphery for receiving bolts 18 which, together with nuts 20, secure the outer portions of the parts 12 and 14 together. Part 14 is provided with a circular recess 22 in the face which opposes the part 12, thereby providing a space 24 between the parts through which fluid under pressure may flow.

The opposed faces of parts 12 and 14 are provided with respective annular tapered grooves 26 in which the sealing member 10 of the present invention engages. The sealing member, as most clearly seen in FIGURE 2, comprises a pair of concentric annular sealing elements 28 which have curved outer surfaces 30 which respectively engage the tapered surfaces of grooves 26 in parts 12 and 14. By this configuration of the sealing elements 28 and grooves 26, there are provided four lines of contact between the sealing member and parts 12 and 14, the four lines of contact being the points of contact between the curved outer surfaces 30 of sealing elements 28 and the tapered annular side walls of the grooves 26. Preferably, the sealing elements 28 are formed of a material which is softer than the material of parts 12 and 14. Thus, when pressure is applied by means to be described later to the sealing elements 28 to spread them apart into the grooves 26, the sealing elements 28 will deform into the grooves 26 thereby providing a large surface area of sealing contact therebetween and eliminating the leakage of fluid between the parts 12 and 14.

In order to spread the sealing elements 28 apart into the grooves 26, there is provided a resilient annular element in the form of a web 32 which is generally U-shaped in cross-section and surrounds the two sealing elements 28. The resilient annular element 32 has its inner ends rigidly connected to the respective outer portions of the sealing elements 28 by suitable means, such as by brazing, welding, cementing, or the like. The resilient element 32 is prestressed to urge the sealing elements 28 apart so that the sealing elements 28 will be forced into the grooves 26 when positioned between the parts 12 and 14.

The annular resilient element 32 serves an additional function in that it provides a continuous fluid-impervious surface about the periphery of the two sealing elements 28 and thereby prevents the flow of fluid from the space 24 between parts 12 and 14 radially outwardly beyond the two sealing elements 28. By this arrangement, fluid pressure will be retained between the two sealing elements 28 and, therefore, will act to spread the sealing elements 28 apart, thereby causing them to be forcibly urged into the grooves 26 of parts 12 and 14. In order to insure that fluid pressure will enter between the opposed proximal faces of the sealing elements 28, axial projections 34 are provided on each of the opposed proximal faces of the two sealing elements 28, as most clearly seen in FIGURE 3 which serve to space the two sealing elements 28 apart.

A modified form of the sealing member of the present invention is shown in FIGURE 4. In this embodiment, the sealing elements 28 are bifurcated as indicated at 36 along their distal faces so as to provide resilient sealing lips on the sealing elements 28 which will enhance the spring loading of the sealing elements 28 within the grooves 26. The sealing elements 28 of FIGURE 4 are also provided with annular recesses 38 adjacent their outer peripheries for housing the inner portions of the generally U-shaped resilient annular element 32. In this manner, the welds or other means for rigidly securing the inner ends of the resilient annular element 32 to the sealing elements 28 will be positioned out of the grooves 26, thus insuring intimate contact between the bifurcated curved surfaces of the sealing elements 28 and the tapered side walls of grooves 26.

The modification shown in FIGURE 5 is similar to that shown in FIGURE 4 except that the U-shaped resilient annular element 32 is disposed entirely within the annular recesses 38 in sealing elements 28. This form of the sealing member will be of advantage if there is no space left at the periphery of the sealing member as shown in FIGURE 1 for receiving the resilient annular element 32. FIGURE 6 is similar to the embodiment shown in FIGURE 2, but instead of the resilient element 32 being a continuous separate ring connected at its inner edges to the sealing elements 28 by welding, brazing, or the like, the resilient element 32 is divided into two annular sections in the form of legs 40. Each of the sections 40 is integral with one of the annular sealing elements 28 and the sections 40 are rigidly joined at their outer peripheries as indicated at 42 in FIGURE 6 by, suitable means, such as welding, brazing, or the like.

It can be appreciated by the above description that the seal of the present invention uses both mechanical and fluid pressure loading to prevent leakage. The resilient element 32 provides mechanical loading, since it is pre-stressed to urge the annular sealing elements 28 apart so that they will be forced into the grooves 26 of the parts 12 and 14. The sealing member may be used to great advantage in eliminating static seal leakage, since the mechanical load induced on the sealing member by tightening the bolts 18 together with the tension of the resilient element 32 will be sufficient to provide an effective seal even though there is no fluid pressure in the space 24 between the two parts 12 and 14. If there is fluid under pressure within the space 24, it will provide fluid pressure loading of the sealing member by expanding the annular sealing elements 28 apart into the grooves 26 as explained hereinabove.

Although the means for retaining fluid pressure between the sealing elements 28 so that fluid pressure loading of the sealing member may be accomplished and the spring biasing means for urging the two annular sealing elements 28 apart have been shown as a single resilient element 32, it should be apreciated that the dual function of the resilient element 32 could be performed as individual functions by separate components of the sealing member. For example, the two sealing elements 28 could be spring-biased apart by circumferentially spaced coil springs disposed between the two sealing elements 28. To retain fluid pressure between the two sealing elements 28 so that fluid pressure loading of the sealing member may be accomplished, a flexible strip of sealing material could be used to connect the outer peripheries of the sealing elements 28. Of course, such a structure would be more expensive to manufacture and would fail to have the simplicity of construction of the embodiments disclosed in the drawing herein.

It will of course be understood that various other changes can be made in the form, details, arrangement, and proportions of the various parts without departing from the spirit and scope of the invention as defined by the following claims.

I claim:

1. A sealing member for forming a seal between two parts having opposed inwardly facing annular grooves, said sealing member comprising a pair of axially alined annular sealing elements, each of said annular sealing elements being axially elongated, a resilient annular channel-shaped impervious web extending between said sealing elements at the outer peripheries thereof and axially biasing the sealing elements apart, and means between the adjacent radial faces of said pair of annular sealing elements for retaining an axially spaced relationship between said adjacent radial faces.

2. A sealing member for forming a seal between two parts having opposed inwardly facing annular grooves, said sealing member comprising a pair of axially alined annular sealing elements, each of said annular sealing elements being axially elongated, a resilient annular channel-shaped impervious web extending between said sealing elements at the outer peripheries thereof and axially biasing the sealing elements apart, and said pair of annular sealing elements being bifurcated along their distal oppositely directed faces.

3. A sealing member for forming a seal between two parts having opposed inwardly facing annular grooves, said sealing member comprising a pair of axially alined annular sealing elements, each of said annular sealing elements being axially elongated, a resilient annular channel-shaped impervious web extending between said sealing elements at the outer peripheries thereof and axially biasing the sealing elements apart, the outer peripheries of said annular sealing elements being provided with recesses opening into the adjacent radial faces thereof, and said web having opposite radially inwardly disposed end portions provided with upturned extensions received in the recesses and respectively secured to said pair of annular sealing elements.

4. A sealing member for forming a seal between two parts having opposed inwardly facing annular grooves, said sealing member comprising a pair of axially alined annular sealing elements, each of said annular sealing elements being axially elongated, a resilient annular channel-shaped impervious web extending between said sealing elements at the outer peripheries thereof and axially biasing the sealing elements apart, the outer peripheries of said annular sealing elements being provided with recesses opening into the adjacent radial faces thereof, said web being wholly received between said pair of annular sealing elements in said recesses, and said web having opposite end portions respectively secured to said pair of annular sealing elements and opening radially outwardly.

5. In combination, a pair of parts having opposed inwardly facing annular grooves, each of said grooves being axially tapered in a direction away from the other groove to define a mouth for each groove wider than the bottom wall thereof and inclined side walls convergent toward the bottom wall, a sealing member comprising a pair of axially alined annular sealing elements respectively received in said grooves in sealing engagement with the side walls there, each of said annular sealing elements being axially elongated, said pair of annular sealing elements being bifurcated along their distal oppositely directed faces, and a resilient annular channel-shaped impervious web extending between said sealing elements at the outer peripheries thereof and axially biasing the sealing elements apart for forcing said sealing elements toward the bottom walls of the respective grooves to maintain said sealing elements in sealing engagement with the side walls of the grooves.

6. In combination, a pair of parts having opposed inwardly facing annular grooves, each of said grooves being axially tapered in a direction away from the other groove to define a mouth for each groove wider than the bottom wall thereof and inclined side walls convergent toward the bottom wall, a sealing member comprising a pair of axially alined annular sealing elements respectively received in said grooves in sealing engagement with the side walls thereof, each of said annular sealing elements being axially elongated, a resilient annular channel-shaped impervious web extending between said sealing elements at the outer peripheries thereof and axially biasing the sealing elements apart for forcing said sealing elements toward the bottom walls of the respective grooves to maintain said sealing elements in sealing engagement with the side walls of the grooves, said web forming an annular wall between said pair of annular sealing elements to prevent leakage of pressure fluid past said sealing member so that pressure fluid may be contained between said sealing elements to augment the force of said web in axially biasing the sealing elements apart for enhancing the degree of sealing engagement between said sealing elements and the side walls of the grooves, and means between the adjacent radial faces of said pair of annular sealing elements for retaining an axially spaced relationship between said adjacent radial faces so that pressure fluid may be admitted into the area between said sealing elements.

7. A sealing member as defined in claim 1, wherein said means for retaining an axially spaced relationship between said adjacent radial faces of said pair of annular sealing elements comprises axial projections respectively integral with each of said adjacent radial faces and respectively extending toward the opposite one of said adjacent radial faces.

8. In combination, a pair of parts having opposed inwardly facing annular grooves, a sealing member comprising a pair of axially alined annular sealing elements respectively received in said grooves in sealing engagement with the side walls thereof, said sealing elements and the side walls of the respective grooves engaged thereby being disposed in wedging relationship, means defining a space between the opposed surfaces of said parts including an annular portion extending radially outwardly of said sealing elements, a resilient annular channel-shaped impervious web extending between said sealing elements at the outer peripheries thereof and axially biasing the sealing elements apart for forcing said sealing elements toward the bottom walls of the respective grooves to maintain said sealing elements in sealing engagement with the side walls of the grooves, and said web extending radially outwardly from said sealing elements and being received in the annular portion of the space between the opposed surfaces of said parts which is disposed radially outwardly of said sealing elements.

9. The combination defined in claim 8, wherein said web comprises respective radially outwardly extending annular legs integral with the annular sealing element corresponding thereto and including axially inturned radially outwardly disposed end portions secured together.

References Cited by the Examiner

UNITED STATES PATENTS

| | | | |
|---|---|---|---|
| 1,965,273 | 7/34 | Wilson | 277—180 X |
| 2,181,203 | 11/39 | Reynolds | 277—211 |
| 2,366,161 | 1/45 | Tweedale | 277—206 |
| 2,422,009 | 6/47 | Goetze | 277—171 X |
| 2,610,870 | 9/52 | Parmesan | 277—211 X |
| 2,927,830 | 3/60 | Workman | 277—205 X |

LEWIS J. LENNY, *Primary Examiner.*

EDWARD V. BENHAM, *Examiner.*